US007221721B2

(12) United States Patent
Kim et al.

(10) Patent No.: US 7,221,721 B2
(45) Date of Patent: May 22, 2007

(54) FREQUENCY OFFSET CALCULATION METHOD USING LOG TRANSFORMS AND LINEAR APPROXIMATION

(75) Inventors: Jun-Woo Kim, Daejeon (KR); Young-Ha Lee, Daejeon (KR); Young-Hoon Kim, Daejeon (KR); Youn-Ok Park, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 815 days.

(21) Appl. No.: 10/334,938

(22) Filed: Dec. 31, 2002

(65) Prior Publication Data

US 2004/0096019 A1 May 20, 2004

(30) Foreign Application Priority Data

Nov. 15, 2002 (KR) ............... 10-2002-0071218

(51) Int. Cl.
*H04L 27/06* (2006.01)
*G06F 1/02* (2006.01)
*G06F 17/10* (2006.01)
(52) U.S. Cl. .................. 375/344; 708/277; 708/309
(58) Field of Classification Search ............ 375/316, 375/344, 260, 222, 295, 362, 354; 455/164.1, 455/75, 182.1, 71, 164.2, 112, 182.2, 113, 455/136; 370/203, 206, 207, 208, 335, 342; 708/277, 270, 200, 100, 309
See application file for complete search history.

(56) References Cited

U.S. PATENT DOCUMENTS 5,282,228 A * 1/1994 Scott et al. ............... 375/344

5,732,113 A  3/1998 Schmidl et al.

FOREIGN PATENT DOCUMENTS

| KR | 1020010039095 | 5/2001 |
| KR | 1020020017523 | 3/2002 |
| KR | 1020020024937 | 4/2002 |
| KR | 1020020066023 | 8/2002 |
| WO | WO9418792 | 8/1994 |

OTHER PUBLICATIONS

OFDM, IEEE 802.11a LAN, "A Synchronization Technique for and IEEE 802.11a High-speed Wireless LAN Modem of OFDM Scheme", J. Oh, et al., 4 pages.
IEEE Transactions on Communications, vol. 45, No. 12, Dec. 1997, "Robust Frequency and Timing Synchronization for OFDM", T. Schmidl, et al., p. 1613-1621.
"The Low-Area of New Arc-Tangent Look-Up Table and A Low Overhead for CATV Modem Systems", Y. Ban, et al., 4 pages.

* cited by examiner

*Primary Examiner*—Tesfaldet Bocure
*Assistant Examiner*—Vineeta Panwalkar
(74) *Attorney, Agent, or Firm*—Blakely Sokoloff Taylor & Zafman

(57) ABSTRACT

A method for calculating frequency offset using arc tangent calculations according to real part and imaginary part input values received externally. The method includes converting arc tangent equations for determining frequency offset into equations to perform log calculations; calculating frequency offset using linear approximation and the converted log equations; and dividing the real part input value to bit values of a predetermined size to realize a size similar to that of the imaginary part input value if a range of the frequency offset value to be calculated is small. With the use of the method, hardware area and power consumption may be reduced, and precise frequency offset may be calculated.

7 Claims, 6 Drawing Sheets

FREQUENCY OFFSET CALCULATION METHOD USING LOG TRANSFORMS AND LINEAR APPROXIMATION

BACKGROUND OF THE INVENTION (a) Field of the Invention

The present invention relates to a method for calculating frequency offset in an orthogonal frequency division multiplexing system, and more particularly, to a frequency offset calculation method that uses log transforms and linear approximation.

(b) Description of the Related Art

If in orthogonal frequency division multiplexing an offset occurs between transmission and reception frequencies by the imprecision in an oscillator and a difference in carrier wave frequencies of a transmission side and a receiving side, interference between channels results. Also, if this offset accumulates, precise fast Fourier transform (FFT) is unable to be performed on the receiving side to thereby prevent the ability to demodulate data.

Therefore, frequency offset must be obtained by only a short training sequence in an orthogonal frequency division multiplexing system. At this time, frequency offset may be obtained using two or more consecutive and identical training sequence phase differences.

In more detail, if a period of the training sequence $Y[n]$ is $N$, two training sequence samples received in an interval of $N$ samples are as shown in the following equations.

$$Y[n] = \frac{1}{N}\sum_{k=0}^{N-1} X[k] \cdot e^{j2\pi n(k+\epsilon 0)/N} \qquad \text{[Equation 1]}$$

$$Y[n+N] = \frac{1}{N}\sum_{k=0}^{N-1} X[k] \cdot e^{j2\pi n(k+\epsilon 1)/N}$$

where $X[k]$ is an Nth carrier wave channel, $\epsilon 0$ is the frequency offset normalized in $Y[n]$, and $\epsilon 1$ is the frequency offset normalized in $Y[n+N]$. At this time, the phase difference in the received two training sequence samples is calculated using the following equation.

$$2\pi\epsilon = 2\pi(\epsilon 0 - \epsilon 1) = \angle\{Y[n]^* \cdot Y[n+N]\} \qquad \text{[Equation 2]}$$

where $Y[n]^*$ indicates the conjugate value of $Y[n]$, and $\angle$ is the phase angle calculated using $\tan^{-1}$.

Next, if over the entire length the affect of noise is eliminated by obtaining the integral by as many as N samples, the frequency offset is obtained as follows.

$$\varepsilon = \frac{1}{2\pi}\angle\left[\sum_{n=0}^{N-1}\{Y[n]^* \cdot Y[n+N]\}\right] \qquad \text{[Equation 3]}$$

In the case where the frequency offset is obtained using this method, an approximate frequency offset is found using a short training sequence, which has a short length and is repeated many times, or a precise frequency offset is obtained using a long training sequence, which has a long length and is only repeated two times. The former case is referred to as coarse frequency offset searching, while the latter case is referred to as fine frequency offset searching.

Such a method has been used in conventional orthogonal frequency division multiplexing systems and adopted in standards. An example of this method will be described with reference to FIG. 1.

Figure 1:
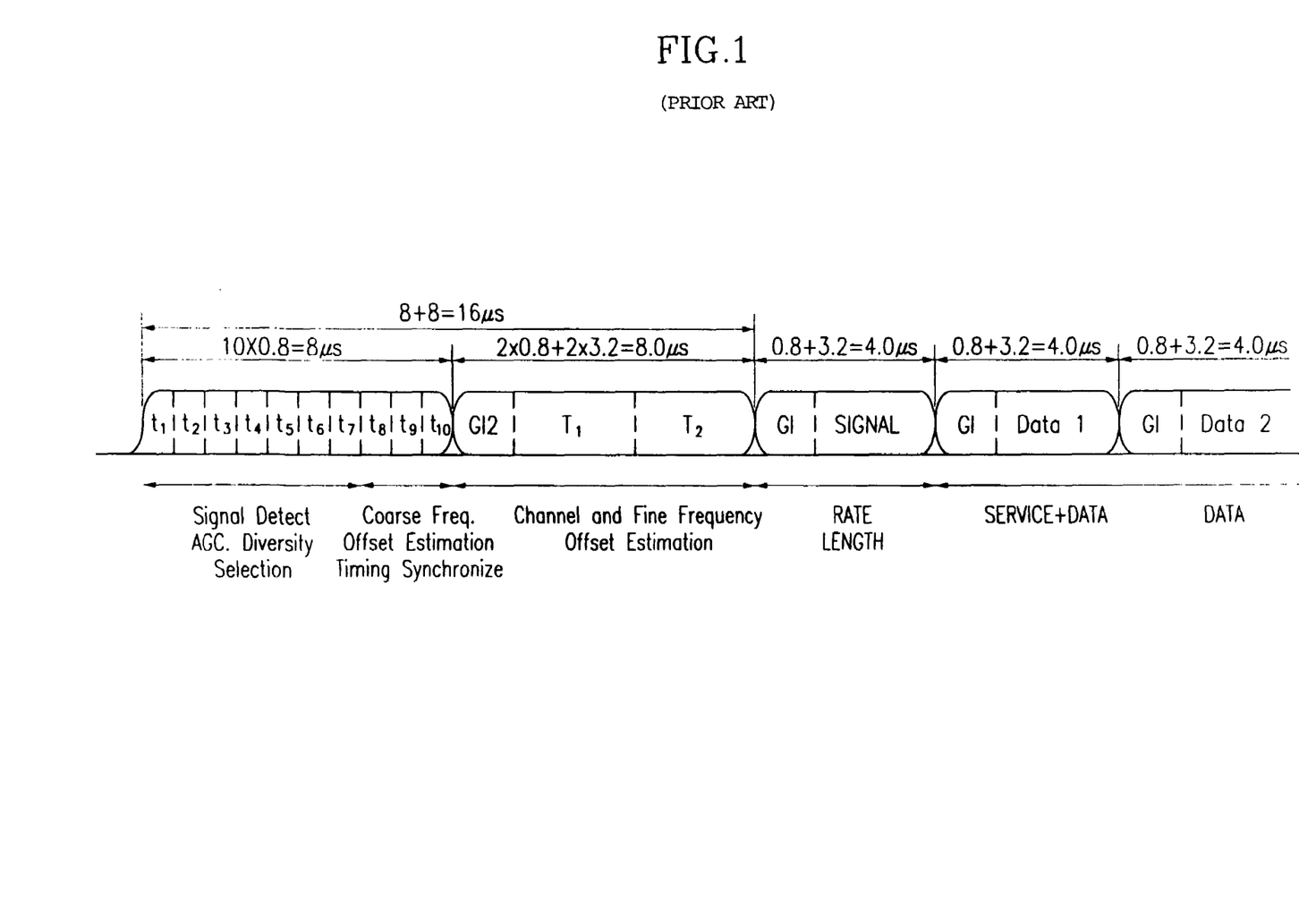
FIG. 1 is a drawing showing an IEEE 802.11a training sequence structure.

FIG. 1 is a drawing of a training sequence structure according to the IEEE 802.11a standard. An equation for calculating frequency offset when the two training sequences are $Y[n]=I_1+jQ_1$ and $Y[n]=I_2+jQ_2$ is as follows.

$$\varepsilon = \frac{1}{2\pi N}\angle(Y[n]^* \cdot Y[n+N]) = \qquad \text{[Equation 4]}$$

$$\frac{1}{2\pi N}\angle(I_1I_2 + Q_1Q_2 + j(I_1Q_2 - I_2Q_1)) =$$

$$\frac{1}{2\pi N}\angle(E_I + jE_Q) = \frac{1}{2\pi N}\tan^{-1}\left(\frac{E_Q}{E_I}\right)$$

Figure 2:
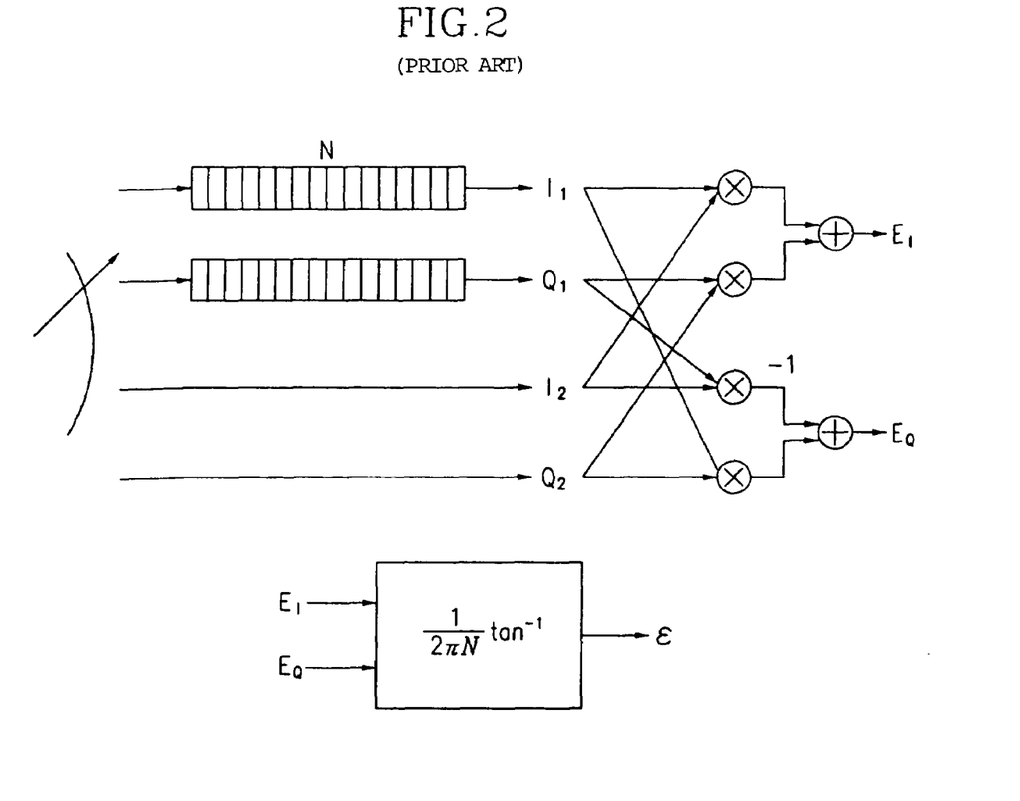
FIG. 2 is a drawing showing an entire structure of logic used to obtain a frequency offset value in an orthogonal frequency division multiplexing system.

An example of logic used to perform this calculation is shown in FIG. 2.

Figure 3:
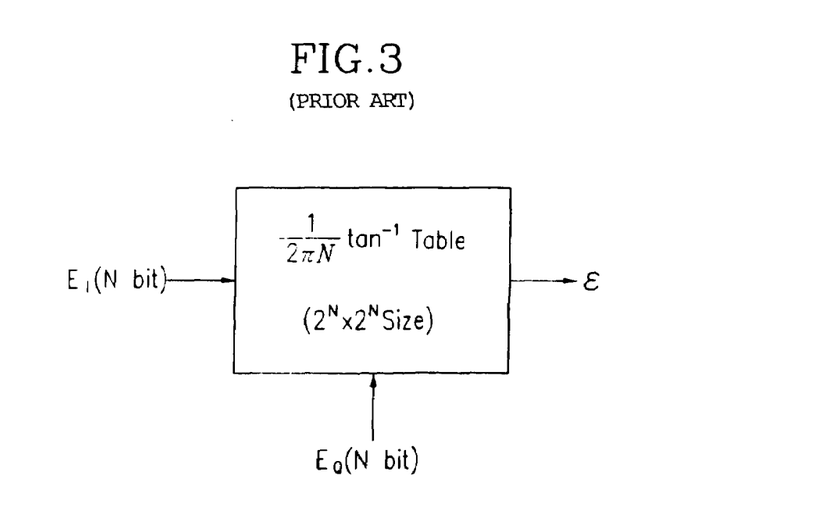
FIG. 3 is a drawing showing a structure of logic used calculate a frequency offset value using an arc tangent look-up table.

FIG. 2 is a drawing showing a structure of logic used to obtain a frequency offset value in an orthogonal frequency division multiplexing system. When calculating frequency offset using the illustrated logic, it is necessary to use the arc tangent ($\tan^{-1}$), and this is performed using a look-up table as shown in FIG. 3.

As shown in the drawings, the arc tangent look-up table receives the real part $E_I$ and the imaginary part $E_Q$, and outputs the value of $$\frac{1}{2\pi N}\tan^{-1}\left(\frac{E_Q}{E_I}\right).$$

In the case where each of the inputs of the real part $E_I$ and the imaginary part $E_Q$ is 4 bits, 16×16=256 bits are needed for the arc tangent look-up table.

Further, if the number of bits of each the real part $E_I$ and the imaginary part $E_Q$ is increased to enhance the precision in the resulting value, the size of the look-up table is exponentially increased. This is particularly problematic in fine frequency offset searching in which the difference in the real part and imaginary part values is large and precise calculations are required. For example, if each of the real part and imaginary part is 8 bits, a look-up table of $2^8 \times 2^8 = 65{,}536$ bits is needed.

An increase in the size of the arc tangent table as a result of more bits for the real part and imaginary part of training sequences results in an increase in hardware area and power consumption.

In a related patent, Samsung Electro Mechanics disclosed Korean Patent Publication No. 10-2000-17523 entitled Frequency Offset Precision Compensation Method for High-Speed Wireless LAN. In this patent, efforts are made to enhance the performance of the high-speed wireless LAN by reducing the size of the arc tangent look-up table used to calculate frequency offset. However, a separate, additional logic is required in this patent to reduce the size of the arc tangent look-up table.

Accordingly, there is a need for a simple logic calculation method for the calculation of frequency offset that minimizes hardware area and power consumption.

SUMMARY OF THE INVENTION

It is one object of the present invention to provide a method for use in an orthogonal frequency division multiplexing system that uses log transforms and linear approximation to perform arc tangent calculations for determining frequency offset, thereby reducing hardware area and power consumption.

In one embodiment, the present invention provides a method for calculating frequency offset using arc tangent calculations according to real part and imaginary part input values received externally. The method includes a) converting arc tangent equations for determining frequency offset into equations to perform log calculations; b) calculating frequency offset using linear approximation and the converted log equations; and c) dividing the real part input value to bit values of a predetermined size to realize a size similar to that of the imaginary part input value if a range of the frequency offset value to be calculated is small.

The converted log equations is, $$\tan^{-1}\left(\frac{E_Q}{E_I}\right) = \tan^{-1}\left(e^{\log E_Q - \log E_I}\right)$$

where $E_I$ is the real part input value and $E_Q$ is the imaginary part input value.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 4:
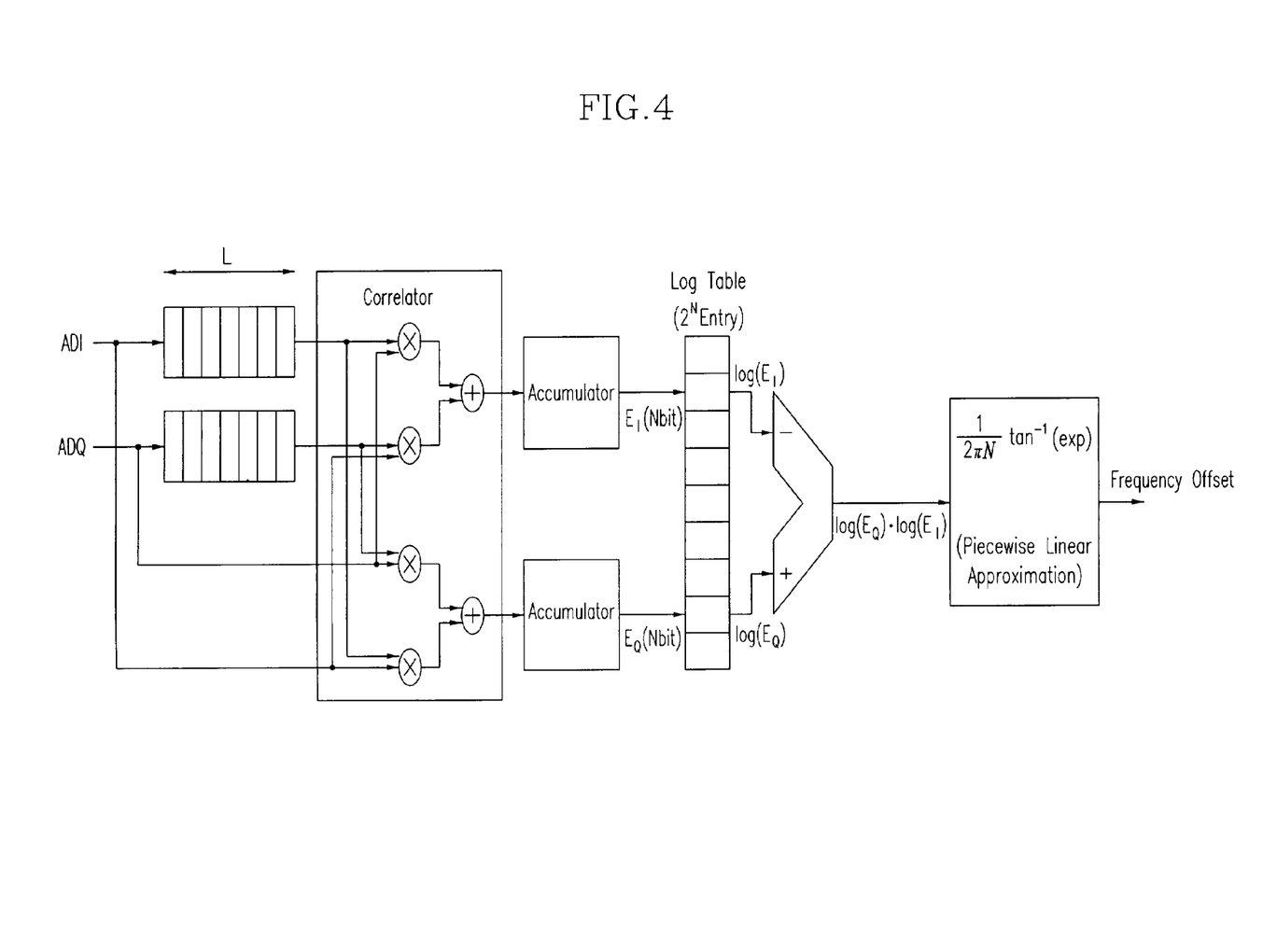
FIG. 4 is a drawing showing a structure of logic used to calculate a frequency offset using log transforms and linear approximation according to a preferred embodiment of the present invention.

FIG. 4 is a drawing showing a structure of logic used to calculate a frequency offset using log transforms and linear approximation according to a preferred embodiment of the present invention.

With respect to two sequences having a length L and that are repeated, the first sequence is stored in a shift register and when the second sequence arrives, a correlation value of the two sequences is obtained in a correlator that is to a rear of the shift register to determine the degree of correlation between the two sequences. The correlator performs the calculation of Equation 4 presented above through hardware. Accumulators perform an accumulation calculation for a sufficient duration of time on I and Q results of the correlator to obtain average values of the I and Q results. These average values are used to perform arc tangent calculations to obtain frequency offset.

Conversion is performed through log calculations using the following equation such that log transforms are used to calculate frequency offset. Such conversion into a log format is done to allow for calculations using an adder instead of a divider since a divider requires more time to perform its operations than an adder.

$$\tan^{-1}\left(\frac{E_Q}{E_I}\right) = \tan^{-1}\left(e^{\log E_Q - \log E_I}\right) \quad \text{[Equation 5]}$$

The log transforms are calculated using a look-up table. In the preferred embodiment of the present invention, a single look-up table is used for both the real part $E_I$ and the imaginary part $E_Q$. As a result, the size of the table (i.e., log look-up table) used in calculating frequency offset may be significantly decreased.

That is, if a number of bits of the real part input $E_I$ and the imaginary part input $E_Q$ is N, unlike the $2^N \times 2^N$ number of bits needed in the conventional arc tangent table, the number of bits required in the log look-up table in the preferred embodiment of the present invention is $2^N$ bits. With such a reduction in the size of the log look-up table, decreases in hardware area and power consumption may be realized.

When performing log transforms, because of the non-linear characteristic of log functions, if the input value is small an extremely small value will result, while if the input value is large a state of saturation is approached so that it is difficult to determine what the actual resulting value is. Because of this characteristic, the number of bits for the input is described as being 4 bits in the preferred embodiment of the present invention. However, the present invention is not limited to this value and it is possible to use more or less bits for the input.

In particular, in the coarse frequency offset calculation method, the desired level of precision may be obtained by using an input of 4 bits. However, in the fine frequency offset calculation method where a greater degree of precision is required, since the real part input of $E_I$ is bigger than the imaginary part input of $E_Q$, Equation 5 is changed as follows using log function characteristics and the calculation is performed using this equation.

$$\tan^{-1}\left(\frac{E_Q}{E_I}\right) = \tan^{-1}\left(e^{\log E_Q - \{\log(0.1 * E_I) + \log(10)\}}\right) = \quad \text{[Equation 6]}$$

$$\tan^{-1}\left(0.1 * e^{\log E_Q - \log(0.1 * E_I)}\right)$$

Since with this equation the value of the large real part input $E_I$ is divided into suitable values and compared with the imaginary part input $E_Q$, the same log transform table may be used in the offset calculation when there is a big difference in the two values.

After calculating the exponent using log calculations in $\tan^{-1}(e^{\log E_Q - \log E_I})$, the remaining $\tan^{-1}(e^x)$ is calculated using the log look-up table. In this case, since the value of the base-e exponent is extremely large, linear approximation is used in the preferred embodiment of the present invention.

Describing linear approximation of the non-linear function in more detail, the graph of $\tan^{-1}(e^x)$ is relatively linear in between $+\pi$ and $-\pi$, and this may be approximated with a certain number of straight lines. For example, in the case of an input of 4 bits (having values from 1 to 15), approximation may be performed using three straight lines. The equation used for this process is as follows.

$$\log(E_Q) - \log(E_1) \leq -1.5 : y = 0.3667 + 0.1000 * (\log(E_Q) - \log(E_1)) \quad \text{[Equation 7]}$$

$$-1.5 < \log(E_Q) - \log(E_1) \leq 1.5 : y = 0.7854 + 0.4329 * (\log(E_Q) - \log(E_1))$$

$$1.5 < \log(E_Q) - \log(E_1) : y = 1.2667 + 0.1000 * (\log(E_Q) - \log(E_1))$$

If this function is approximated using five lines, the following equation is used.

$$\log(E_Q) - \log(E_1) \leq -2 : y = 0.2837 + 0.0780 * (\log(E_Q) - \log(E_1)) \quad \text{[Equation 8]}$$

$$-2 < \log(E_Q) - \log(E_1) \leq -1 : y = 0.5397 + 0.2059 * (\log(E_Q) - \log(E_1))$$

$$1 < \log(E_Q) - \log(E_1) \leq 2 : y = 0.7854 + 0.4329 * (\log(E_Q) - \log(E_1))$$

$$1 < \log(E_Q) - \log(E_1) \leq 1 : y = 1.0003 + 0.2180 * (\log(E_Q) - \log(E_1))$$

$$2 < \log(E_Q) - \log(E_1) : y = 1.2267 + 0.0848 * (\log(E_Q) - \log(E_1))$$

Results of a simulation using this process were as follows. In the case where three straight lines are used for approximation, a maximum error of 15% and an average error of 4% result. If five straight lines are used for approximation, a maximum error of 7% and an average error of 0.5% results. Such errors become greater when the desired resulting values are within a small frequency range. This is because the same error represents a larger percentage of a number that is small.

Further, when more precise calculations are required, either a greater number of straight lines may be used for approximation or an interval of the frequency offset to be obtained is estimated and approximation is performed in that area using more straight lines. That is, the degree of complication of the linear approximation may be varied according to the range of permissible error.

Figure 5:
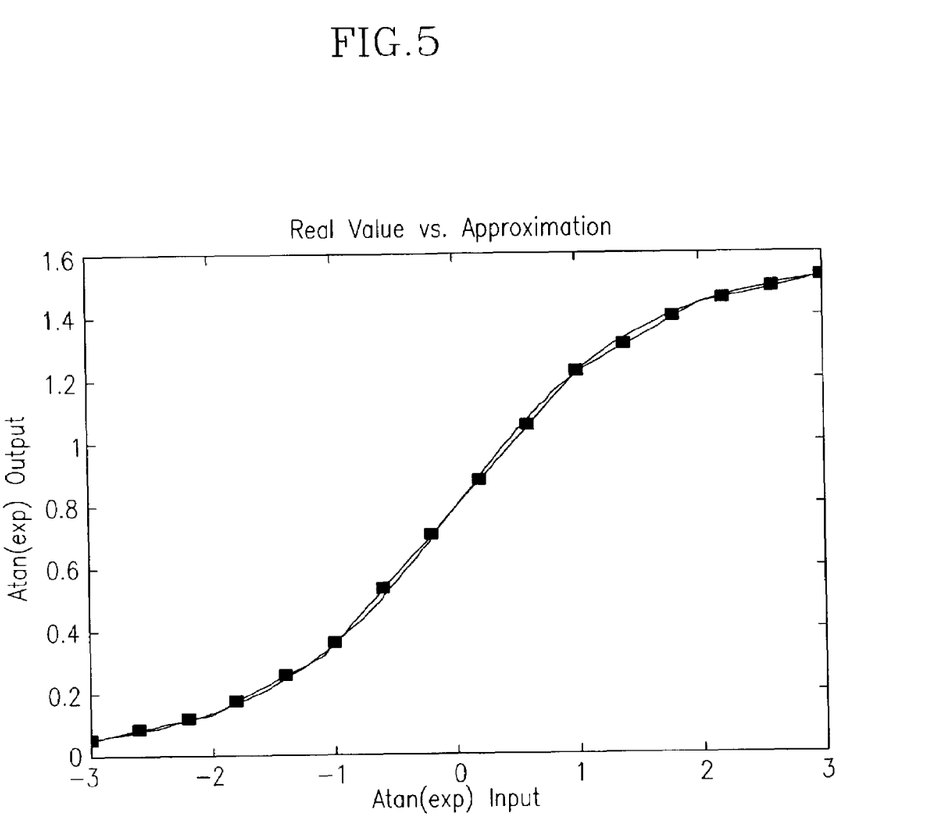
FIG. 5 is a graph comparing real values with approximation values when calculating arc tangent values using linear approximation according to a preferred embodiment of the present invention.

FIG. 5 is a graph comparing a trace of $\tan^{-1}(e^x)$ approximated using five straight lines and a trace of $\tan^{-1}(e^x)$ using real values. As shown in the graph, the difference between the two traces is extremely small.

Accordingly, with the use of the log look-up table when calculating frequency offset, the preferred embodiment of the present invention not only reduces the overall area of hardware but also increases the precision in the resulting values by utilizing linear approximation.

As described briefly above, if the real part input $E_I$ is significantly greater than the imaginary part input $E_Q$, the real part input value $E_I$ is divided into suitable bit values M to allow for the log function to be calculated in a relatively linear region. Logic that performs this process is shown in FIG. 6.

Figure 6:
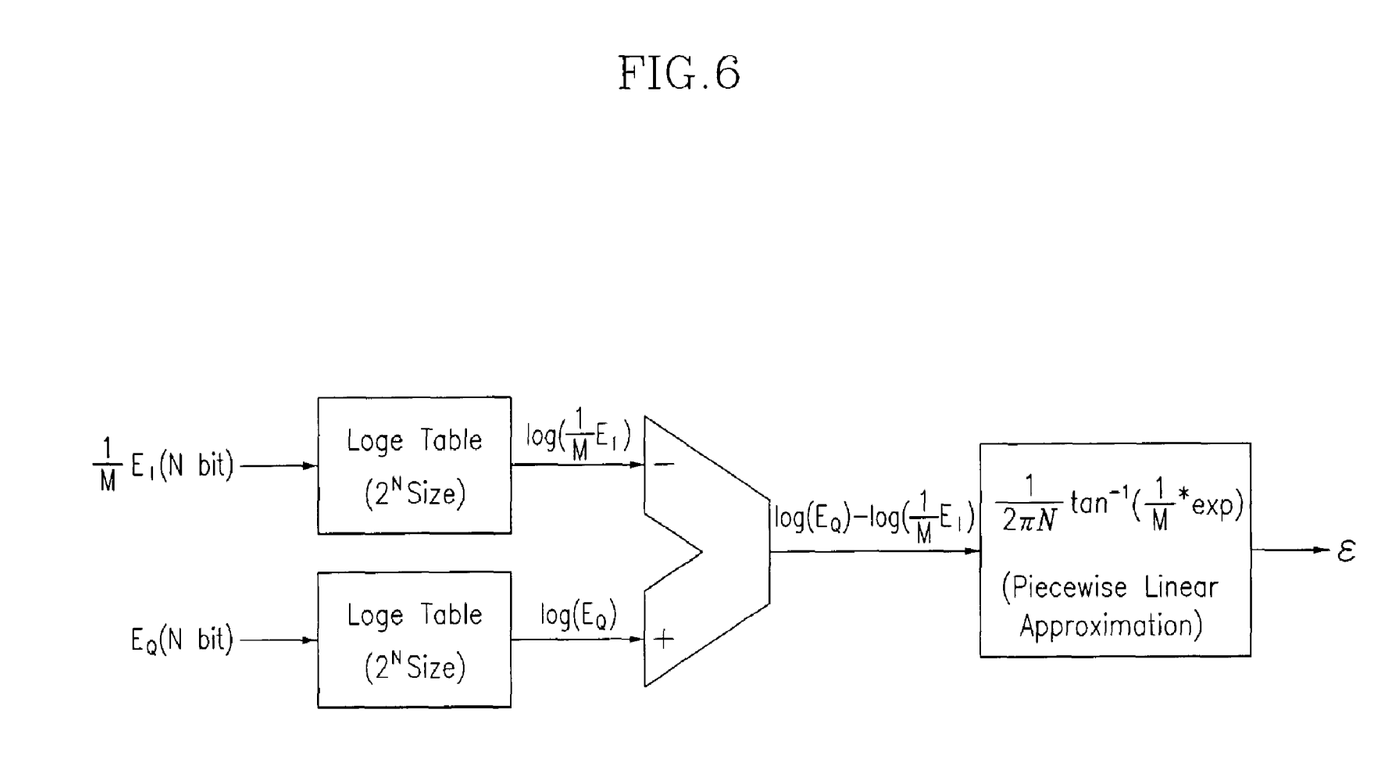
FIG. 6 is a drawing showing a structure of logic used to calculate a frequency offset using log transforms and linear approximation in the case where a difference between real part and imaginary part input values is large according to a preferred embodiment of the present invention.

FIG. 6 is a drawing showing a structure of logic used to calculate a frequency offset using log transforms and linear approximation in the case where a difference between real part and imaginary part input values is large according to a preferred embodiment of the present invention.

As shown in FIG. 6, the real part input value $E_I$ is divided into bit values M of a predetermined size to allow for calculation in a relatively linear region.

Figure 7:
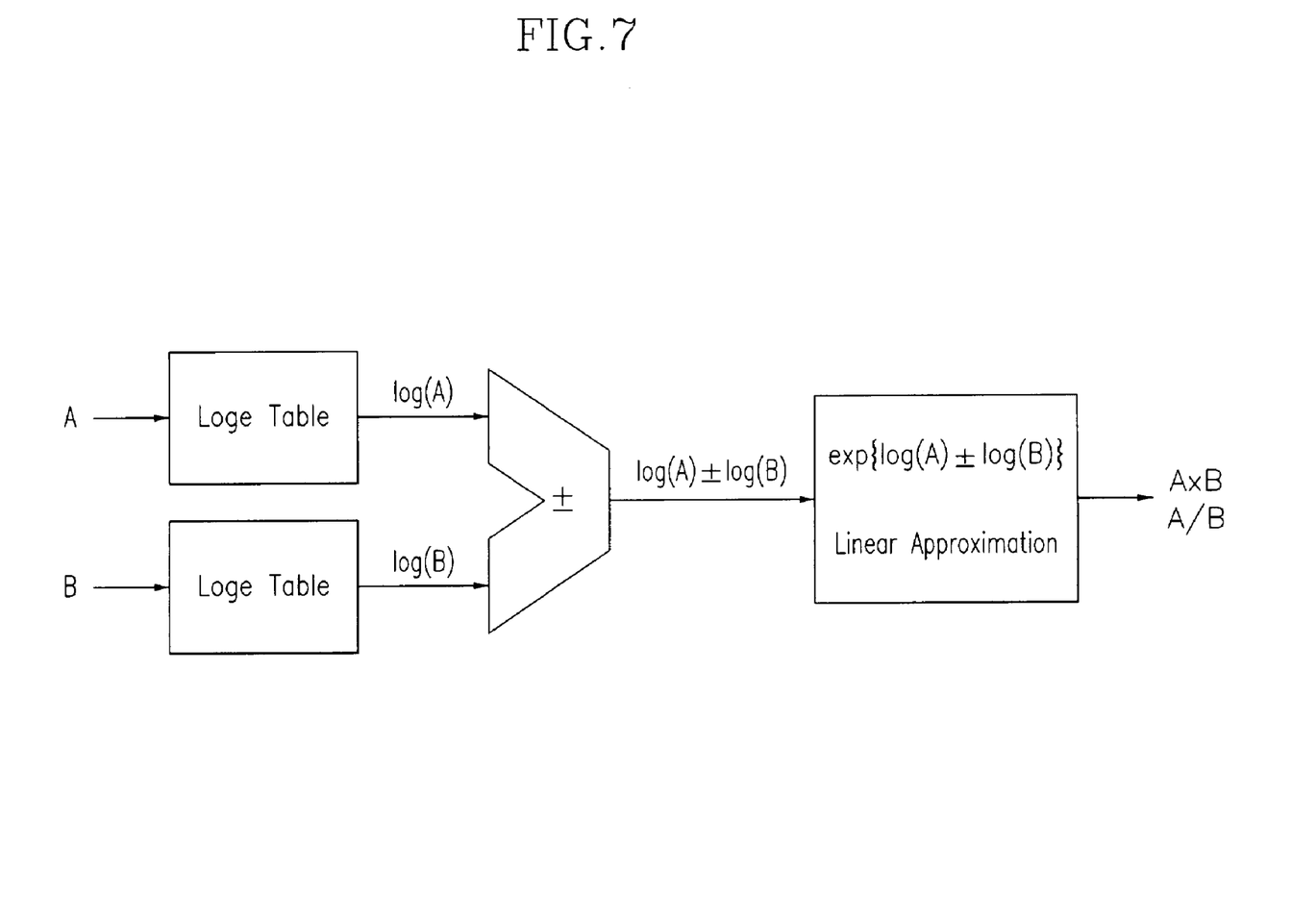
FIG. 7 is a drawing showing a structure of logic used to perform division or multiplication using log transforms and linear approximation according to a preferred embodiment of the present invention.

In the case where a log transform table, an adder, and linear approximation as described above are used, a general multiplier and divider as shown in FIG. 7 may also be realized. FIG. 7 is a drawing showing a structure of logic used to perform division or multiplication using log transforms and linear approximation according to a preferred embodiment of the present invention.

The logic of FIG. 7 may be used in place of a log look-up table in the case where the region of the input values is small and there is a certain permissible error level. Further, even with such application, if the difference in the input values is large, a suitable value is used for multiplication or division of the real part or imaginary part as shown in FIG. 6 so that the log function is calculated in a relatively linear region.

In the method for calculating frequency offset using log transforms and linear approximation of the present invention, when calculating frequency offset, which requires multiplication, division, and non-linear calculations with respect to two or more inputs, a small log look-up table for log transforms, an adder, and linear approximation equations are used such that hardware area and power consumption are reduced, and precision in the resulting values is obtained.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:
1. A method comprising:
in a frequency division multiplexing system,
   a) converting arc tangent equations for determining frequency offset into equations to perform log calculations;
   b) calculating frequency offset using linear approximation and the converted log equations; and
   c) receiving a real part and an imaginary part as input; and
   d) dividing the real part input value to bit values of a predetermined size to realize a size similar to that of the imaginary part input value if a range of the frequency offset value to be calculated is small;
providing the frequency offset to compensate for offset of reception frequencies and transmission frequencies.

2. The method of claim 1, wherein the converted log equations is, $$\tan^{-1}\left(\frac{E_Q}{E_I}\right) = \tan^{-1}\left(e^{\log E_Q - \log E_I}\right) \qquad 5$$

where $E_I$ is the real part input value and $E_Q$ is the imaginary part input value.

3. The method of claim 2, wherein in step a), the log look-up table that outputs arc tangent calculation result values according to the real part and imaginary part input values received externally is used, and the log look-up table is a single table used jointly for the real part and imaginary part input values.

4. The method of claim 3, wherein in step a), if each the real part input value and the imaginary part input value is N bits, the size of the log look-up table is $2^N$ bits.

5. The method of claim 4, wherein if the real part input value is larger than the imaginary part input value, the converted log equation is, $$\tan^{-1}\left(\frac{E_Q}{E_I}\right) = \tan^{-1}\left(e^{\log E_Q - \{\log(0.1*E_I) + \log(10)\}}\right)$$
$$= \tan^{-1}\left(0.1 * e^{\log E_Q - \log(0.1*E_I)}\right).$$

6. The method of claim 4, wherein each of the real part input value and the imaginary part input value is 4 bits.

7. The method of claim 1, further comprising calculating the frequency offset using a multiplier and a divider if a range of the real part and imaginary part input values is small.

* * * * *